(12) United States Patent
Wallin et al.

(10) Patent No.: US 6,548,203 B2
(45) Date of Patent: Apr. 15, 2003

(54) CATHODE COMPOSITION FOR SOLID OXIDE FUEL CELL

(75) Inventors: Sten A. Wallin, Midland, MI (US); Sunil D. Wijeyesekera, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 10/127,074

(22) Filed: Apr. 19, 2002

(65) Prior Publication Data

US 2002/0187389 A1 Dec. 12, 2002

Related U.S. Application Data

(63) Continuation of application No. 09/620,627, filed on Jul. 20, 2000, now abandoned, and a continuation-in-part of application No. 08/921,421, filed on Aug. 29, 1997, now Pat. No. 5,937,264, said application No. 08/846,741, filed on Apr. 30, 1997, now Pat. No. 6,117,582, and a continuation-in-part of application No. 08/834,588, filed on Apr. 7, 1997, now Pat. No. 6,017,647, and a continuation-in-part of application No. 08/559,582, filed on Nov. 16, 1995, now Pat. No. 5,670,270.

(51) Int. Cl.$^7$ ............................................. H01M 8/10
(52) U.S. Cl. ........................... 429/45; 429/44; 429/40
(58) Field of Search ............................ 429/45, 44, 40

(56) References Cited

U.S. PATENT DOCUMENTS 5,543,239 A * 8/1996 Virkar et al. ................ 429/93
6,117,582 A * 9/2000 Wallin et al. ................ 429/45

* cited by examiner

Primary Examiner—Kishor Mayekar
(74) Attorney, Agent, or Firm—Robert C. Baraona

(57) ABSTRACT

A high performance electrocatalyst is based on transition metal perovskites of praseodymium, samarium, terbium or neodymium which react with YSZ to form a product which is itself active as the cathode in a fuel cell. While $PrCoO_3$ reacts with YSZ, the reaction product(s) do not result in severe degradation of cell performance. A fuel cell made with a cathode composed of only the reaction product of YSZ and $PrCoO_3$ has good performance, indicating that this phase is itself not only a good conductor, but also a good catalyst for oxygen activation.

4 Claims, 3 Drawing Sheets reaction layer (active as fuel cell electrode)

--◇-- ($Pr_6O_{11}$ + $ZrO_2$) Product
--○-- ($Pr_6O_{11}$ + YSZ) Product
--●-- ($PrCoO_3$ + YSZ) Product

CATHODE COMPOSITION FOR SOLID OXIDE FUEL CELL

CROSS-REFERENCE TO RELATED APPLICATION

This is a continuation-in-part application to Ser. No. 08/559,582, filed Nov. 16, 1995, now U.S. Pat. No. 5,670,270; Ser. No. 08/921,421, filed Aug. 29, 1997 now U.S. Pat. No. 5,937,264; and Ser. No. 08/834,588, filed Apr. 7, 1997 and now U.S. Pat. No. 6,017,647; a divisional application of Ser. No. 08/846,741, filed Apr. 30, 1997, now U.S. Pat. No. 6,117,582; and a Continuation application of Ser. No. 09/620,627, filed Jul. 20, 2000, now abandoned. These patents and applications are all incorporated herein by reference. Unless otherwise stated, applications are all incorporated herein by reference. Unless definitions of terms in U.S. Pat. No. 5,670,270 are valid for this disclosure also.

BACKGROUND OF THE INVENTION

This invention relates to a cathode composition for improving the stability of high performance solid oxide fuel cells which uses a stabilized zirconia as the electrolyte membrane and (optionally) as one component of the cathode. The high performance of such cells is reduced by reactions between the electrocatalyst (usually a perovskite) and YSZ. This problem is particularly acute when rare earth perovskites of cobalt, known to be excellent cathodic electrocatalysts for solid oxide fuel cells, are used to boost cell performance. For example, lanthanum cobaltite reacts with YSZ to form an insulating layer of lanthanum zirconate, which severely degrades the performance of the cell by inhibiting the flow of electrons and ions within the fuel cell. Other lanthanum perovskites such as manganites and ferrites also react with YSZ but not as readily.

It is known to prepare a solid oxide fuel cell comprising a dense electrolyte membrane of a ceramic oxygen ion conductor, a porous anode layer of a ceramic or a metal or, most commonly, a ceramic-metal composite, in contact with the electrolyte membrane on the fuel side of the cell, and a porous cathode layer of an electronically-conductive metal oxide on the oxidant side of the cell which generates electricity through the electrochemical reaction between a fuel and an oxidant. This net electrochemical reaction involves charge transfer steps that occur at the interface between the ionically-conductive electrolyte membrane, the electronically-conductive electrode and the vapor phase (fuel or oxygen).

Electrode structures comprising a porous layer of electrolyte particles on a dense electrolyte membrane with electrocatalyst material on and within the porous layer of electrolyte are known. In such electrodes, the electrocatalyst material is continuous on the surface of the porous electrolyte material to create a three phase boundary (TPB) where the electrolyte material, electrocatalyst, and gas are in contact. The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics. For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

U.S. Pat. No. 3,377,203 discloses a method for producing fuel cells of solid electrolyte and ceramic oxide electrode layers by sintering the electrode layers to the electrolyte. U.S. Pat. No. 4,767,518 discloses a solid oxide electrode (anode) made of metal particles that are immobilized by stabilized zirconia which may also contain praseodymium (Pr). The Pr may be added in the form of a solution. U.S. Pat. No. 4,885,078 discloses an electrochemical device which may be a solid oxide cell which comprises a porous electrode containing a deposit of metal oxide or metal Basalt capable of forming metal oxide upon heating, where the metal may be Pr. U.S. Pat. No. 5,021,304 discloses a method of coating a separate electronically conducted layer on a porous electrode having the steps of applying a mixture of metal salts including nitrates to the electrodes with a surfactant, and heating to form the oxides. Pr oxide is included in a list of dopant oxides which may be used.

SUMMARY OF THE INVENTION

The present invention covers the use of a high performance electrocatalyst, based on transition metal perovskites of praseodymium, samarium, terbium or neodymium, which react with YSZ to form a product which is itself active as the cathode in a fuel cell. While $PrCoO_3$ reacts with YSZ, the present inventors have discovered that the reaction product(s) do not result in severe degradation of cell performance. A fuel cell made with a cathode composed of only the reaction product of YSZ+$PrCoO_3$ has good performance, indicating that this phase is itself not only a good conductor, but also a good catalyst for oxygen activation.

In a fuel cell containing such an electrocatalyst, there is an initial induction period where reaction between YSZ and the electrocatalyst takes place, but after this induction period the fuel cell performance is stable. The presumed structure of the interface between YSZ and the electrocatalyst ($PrCoO_3$) is shown in FIG. 1.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
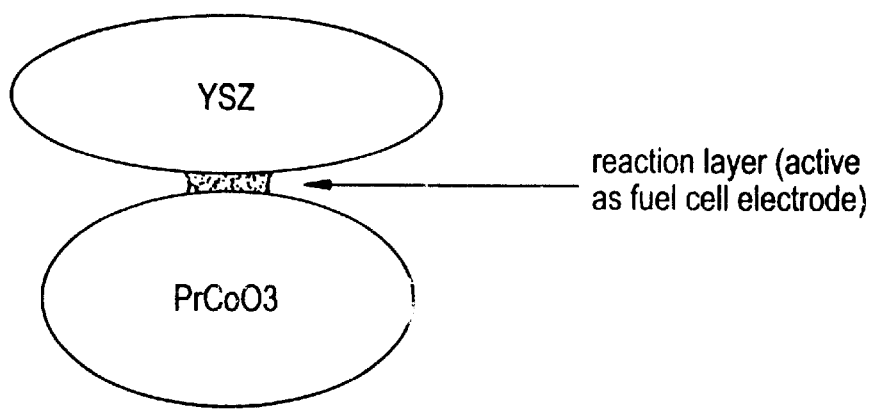
FIG. 1 is a schematic illustration of the presumed interface between YSZ and the electrocatalyst according to the invention.

The term "oxygen electrode" as used herein refers to the electrode at which oxygen is either reduced, or oxygen anions are oxidized, depending on the function of the cell, such as the cathode portion of a solid oxide fuel cell or the anode portion of an electrolytic cell.

The term "stabilized zirconia" as used herein refers to a cubic-stabilized or tetragonal, such as yttrium-stabilized, ytterbium-stabilized, calcium-stabilized, and scandium-stabilized. The stabilized zirconia and the other components may be employed in any suitable amount, but are preferably employed in an amount, based on the weight of the portion of the electrode which contains a mixture of ionically-conductive and electrically conductive particles, of at least about 30 percent by weight of each. If an electrocatalyst different from the electrically-conductive material is employed, it is preferably present in an amount, based on the weight of the portion of the electrode which contains a mixture of ionically-conductive and electrically-conductive particles, of at least 0.01 weight percent.

The electrode structure of the invention may be prepared by any suitable method. For example, an unsintered mixture of stabilized zirconia and cobaltite of praseodymium, samarium, terbium, or neodymium may be deposited on a layer comprising a sintered or unsintered ionically-conductive electrolyte material, and then sintered, to ensure sufficient contact between the layers. In another embodiment, a porous layer of stabilized zirconia particles is infiltrated with a slurry of the cobaltite particles (or a solution precursor thereof), under conditions sufficient to distribute the cobaltite particles in the porous layer of zirconia particles. In another embodiment, a layer of a mixture of stabilized zirconia and a different electrically-conductive material is deposited on a layer of ionically-conductive electrolyte material, sintered, and then infiltrated with a slurry of the cobaltite particles (or a solution precursor) different from the electrically-conductive material, under conditions sufficient to disperse the cobaltite particles. Examples of electrically-conductive materials include lanthanum manganite, strontium-doped lanthanum manganite, praseodymium manganite, or strontium-doped praseodymium manganite, and is preferably praseodymium manganite, or strontium-doped praseodymium manganite. If solution precursors of a cobaltite are used, they will form the cobaltite as the infiltrated layer is heated. The cobaltite and stabilized zirconia will react to form the corresponding zirconate-containing reaction product when sufficiently heated. Preferably, the cobaltite is a strontium-doped cobaltite of praseodymium, samarium, terbium, or neodymium. Preferably, the oxygen electrode has an electrical conductivity of at least 1 S/cm.

The following examples are given to illustrate the invention and should not be interpreted as limiting it. Unless stated otherwise, all parts and percentages are given by weight.

EXAMPLE 1

A 1.25" dia. disk was pressed from 2.5 g of a mixture of NiO(62 wt %)/YSZ(38 wt %). YSZ is yttria stabilized zirconia. A thin coating of YSZ was applied to one face of the NiO/YSZ disk by placing 7 to 8 drops of a dispersion of YSZ (Tosoh TZ-8Y) in absolute ethanol on the face of the disk and quickly tilting the disk in a circular fashion to completely and as uniformly as possible cover the face of the disk. The coated disk was allowed to dry for 50 minutes under a glass cover dish. The coating procedure is repeated three more times for a total of four applications (this typically yields a fired YSZ membrane about 15 $\mu$m thick).

Next, a coating of a mixture of YSZ, $PrMnO_3$ and graphite was applied to the face of the disk which was previously coated with YSZ. The YSZ/$PrMnO_3$/graphite mixture was prepared by sonicating for 4 minutes a suspension of 1.8 g YSZ (Tosoh TZ-8Y), 1.8 g $PrMnO_3$, and 1.5 g of graphite (Alfa, −325 mesh size) in 22 mL of absolute ethanol. After drying for about 2 hours, the disk was fired according to the following schedule: heat from room temperature to 300° C. in 1:10 (1 hour 10 minutes), 300° C. to 750° C. in 5:00, 750° C. to 800° C. in 1:30, 800° C. to 1200° C. in 2:30, 1200° C. to 1225° C. in 3:00, cool 1225 to 1000° C. in 2:00, 1000° C. to 500° C. in 2:30, then furnace cool from 500° C. to room temperature (RT). The trilayer disk was creep flattened by firing under the weight of a setter for 3 hours at 1250° C.

The porous LSM/YSZ layer of the sintered disk was then infiltrated with a 1M aqueous solution of praseodymium (Pr) nitrate and IM cobalt (Co) nitrate. After drying at room temperature for about 1 hour, the trilayer disk was fired at 900° C. for 1 hour to yield a solid oxide fuel cell having high performance and a cathode having long term stability with respect to the formation of insulating interfacial reaction products.

Another innovation of the present invention was the use of $PrCoO_3$ as the electrocatalyst. This material was discussed in the literature as a potential cathode, but was not widely used because of a large thermal coefficient of expansion (TCE) mismatch with the rest of the cell that led to a spaling of the cathode. However, according to the present invention, it is shown that a single infiltration of $PrCoO_3$ into a cell containing YSZ-LSM as the cathode support gives cells that have both high performance and good reliability.

The following discussion and data shows the improved reliability of cells based on $PrCoO_3$/YSZ composites, compared to $La_{1-x}Sr_xCoO_3$/YSZ composites. For the latter example, the well documented reaction between LSC and YSZ to form insulating lanthanum zirconates inhibits reliability in these cells. One explanation is that $PrCoO_3$ is less reactive with YSZ than $La_{1-x}Sr_xCoO_3$. However, we will show herein that the difference between the praseodymium and lanthanum compounds is not based on differences in reactivity, but rather on the nature of the reaction products. When $PrCoO_3$ reacts with YSZ it forms a reaction product that has all the functions of an operating cathode. This surprising result suggests a new way to design composite cathodes.

Experimental Efforts

Step a: Synthesis of $PrCoO_3$ by Complexation with Citric Acid

A. Preparation of Cobalt Citrate

To prepare the cobalt citrate, 72.8 grams of cobalt (II) nitrate hexahydrate (Aldrich, ACS reagent) were dissolved in 90 ml of ethylene glycol (Aldrich spectrophotometric) in a 1 liter beaker with mild heating. The amount of cobalt nitrate used corresponded to ¼ mole cobalt. Separately, 48.0 grams of anhydrous citric acid (Aldrich ACS grade) were dissolved in 80 ml of ethylene glycol with mild heating. The clear citric acid solution was added to the blood red cobalt nitrate solution and heated until all the solid had dissolved. The product was filtered with medium speed filter paper (Fisher Q5).

B. Preparation of Praseodymium Citrate

To prepare the praseodymium citrate, 110 grams of praseodymium nitrate hexahydrate (Aldrich, 99.9%) was added to 100 ml of deionized water in a 1 liter Ehrlenmeyer flask on a stirrer hot plate. The water was heated to approximately 70 C and 5 ml of concentrated nitric acid were added to aid in dissolution. After the praseodymium nitrate was completely dissolved, the flask was allowed to air cool and then chilled using an ice bath. Separately, 25 grams of anhydrous citric acid (Aldrich ACS grade) was dissolved in 40 ml of deionized water with mild heating. 19.4 grams of a 65% solution of polyacrylic acid in water was added to the citric acid and the components mixed thoroughly. The polyacrylic acid/citric acid mixture was added dropwise to the chilled praseodymium nitrate solution, which turned yellow-green. The solution was warmed up to room temperature and filtered with medium speed filter paper.

C. Preparation of $PrCoO_3$

To prepare the $PrCoO_3$, the praseodymium and cobalt citrates were first assayed by heating 3–5 grams of each citrate to 900° C. in air for two hours. The amount of solid left on the crucible was used to determine the percentage oxide in each mixture.

78.23 grams of praseodymium citrate (13.2% $Pr_6O_{11}$) and 78.99 grams of cobalt citrate (6.15% $Co_3O_4$) were added to a 1000 ml beaker. The liquids were mixed on a stirrer hot plate and heated to allow the liquid to evaporate off until the liquid was too viscous to stir. The stir bar was removed and the solution heated to a char. The beaker was heated in an air oven to 500° C. for two hours. The powder was ground in a mortar and pestle and aliquots of the powder were heated to 850° C., 1000° C. and 1250° C. for three hours each. In all cases, x-ray diffraction showed $PrCoO_3$ phase (JCPDS pattern 25-1069) with ≈5% of an unidentified second phase.

D. Preparation of $Pr_{0.9}CoO_3$

To prepare the $Pr_{0.9}CoO_3$, the same procedure was used as in C. above for the $PrCoO_3$ except that 74.65 grams of praseodymium citrate were mixed with 83.79 grams of cobalt citrate in the 1000 ml beaker. The powder was calcined at 800° C. This cobalt rich phase of praseodymium cobaltite was synthesized to determine if there were any differences in reactivity compared to $PrCoO_3$.

E. Scanning Electron Micrograph (SEM) Results of $PrCoO_3$

A few milligrams of $PrCoO_3$ (fired at 800° C. for 5 hours) were dispersed in acetone via sonication. The dispersion was dropped onto an SEM sample stub and the dried material sputter coated to 15 nanometer thickness with a gold palladium alloy. The approximate particle size for $PrCoO_3$ calcined at 800° C. is 1 micron. These 1 micron particles were strongly agglomerated, implying that a technique such as ball milling or attrition milling is necessary if the particles are to be optimally packed during the sintering process.

Step b: Reaction of $PrCoO_3$ with Yttria Stabilized Zirconia (YSZ)

$PrCoO_3$ (formed at 1250° C. for 3 hours) was ground with 8% yttria stabilized zirconia (Tosoh TZ-8Y, Lot Z802348P) in a mole ratio Pr:(Y+Zr) of 0.51:1 using a mortar and pestle. Separately, $PrCoO_3$ (formed at 900° C. for 3 hours) was ground with YSZ in a mole ratio Pr:(Y+Zr) of 0.50:1. The mixtures were heated to various temperatures and the products analyzed by x-ray diffraction (Table 1). The JCPDS reference patterns used to identify the phases listed in Table 1 are 30–1468 for YSZ. 20–1362 for $Pr_2Zr_2O$, and 25–1069 for $PrCoO_3$. The intensities listed in the Table 1 correspond to the areas under the most intense peaks of YSZ (111 peak at 2theta=30.2°), $PrCoO_3$ (220 peak at 2theta=33.6°), and $Pr_2Zr_2O_7$ (222 peak at 2theta=29.1°). The most intense peaks in the YSZ and $Pr_2Zr_2O_7$ phases have no overlap with peaks from the other phases. On the other hand, the 220 peak of $PrCoO_3$ overlaps with the 400 peak of $Pr_2Zr_2O_7$ and hence the intensity of this peak overstates the amount of $PrCoO_3$ present at temperatures (1100° C.) where both phases are present in significant quantities.

TABLE 1

Phase Chemistry of Reaction Mixtures Formed From $PrCoO_3$ and YSZ

| Mole ratio Pr:(Y + Zr) | $PrCoO_3$ calcination temperature | Processing of mixture | x-ray diffraction phase (intensity) |
|---|---|---|---|
| 0:51:1 | 1250° C., 3 hr. | physical mixture | YSZ (100); $PrCoO_3$(42) |
| | | 800° C., 9 hr. | YSZ (100); $PrCoO_3$ (46) |
| | | 800° C., 9 hr. 900° C., 3 hr. | YSZ (100); $PrCoO_3$ (44) |
| | | 800° C., 9 hr. 900° C., 5 hr. 1000° C., 5 hr. | YSZ (100); $PrCoO_3$(38); $Pr_2Zr_2O_7$ (15) |
| | | 800° C., 9 hr. 1100° C., 5 hr. | YSZ (100); $Pr_2Zr_2O_7$ (28); $PrCoO_3$ (25) |
| | | 800° C., 9 hr. 1250° C., 3 hr. | $Pr_2Zr_2O_7$(100); YSZ (62) |
| 0.50:1 | 900° C., 3 hr. | 800° C., 4 hr. 900° C., 3 hr. | YSZ (100); $PrCoO_3$ (46); $Pr_2Zr_2O_7$ (8) |
| | | 800° C., 4 hr. 1100° C., 5 hr. | YSZ (100); $Pr_2Zr_2O_7$(45); $PrCoO_3$(28) |
| | | 800° C., 4 hr. 1250° C., 3 hr. | $Pr_2Zr_2O_7$(100); YSZ (47) |

Since x-ray scattering is related both to crystallinity and atomic number, these relative intensities must be considered qualitive. Nevertheless, Table 1 clearly shows the kinetics of the reaction between YSZ and $PrCoO_3$ to form $Pr_2Zr_2O_7$. The lowest temperature at which $Pr_2Zr_2O_7$ is seen in the x-ray pattern is 1000° C. when $PrCoO_3$ is initially formed at 900° C. These differences in kinetics of product formation can be assumed to be proportional to the relative particle sizes of $PrCoO_3$.

In all cases, the reaction is complete by 1250° C., at which point the only phases seen are YSZ and $Pr_2Zr_2O_7$. Since cobalt is not seen explicitly as part of a crystalline phase, it must either go into solid solution in the YSZ or $Pr_2Zr_2O_7$ phases, or it must form an amorphous phase that is not seen in the x-ray diffraction pattern.

Step c—Impedance Spectroscopy

Impedance spectroscopy, using conventional methods and equipment, was used to characterize the product of the reaction YSZ+$PrCoO_3$→$Pr_2Zr_2O_7$+"Co", which is completed at 1250° C. In order to help interpret the results, we also looked at $Pr_2Zr_2O_7$ prepared from the reaction between $Pr_6O_{11}$ and $ZrO_2$ and yttrium doped $Pr_2Zr_2O_7$ prepared from the reaction between $Pr_6O_{11}$ and YSZ.

A. Sample Preparation $PrCoO_3$+YSZ

Figure 2:
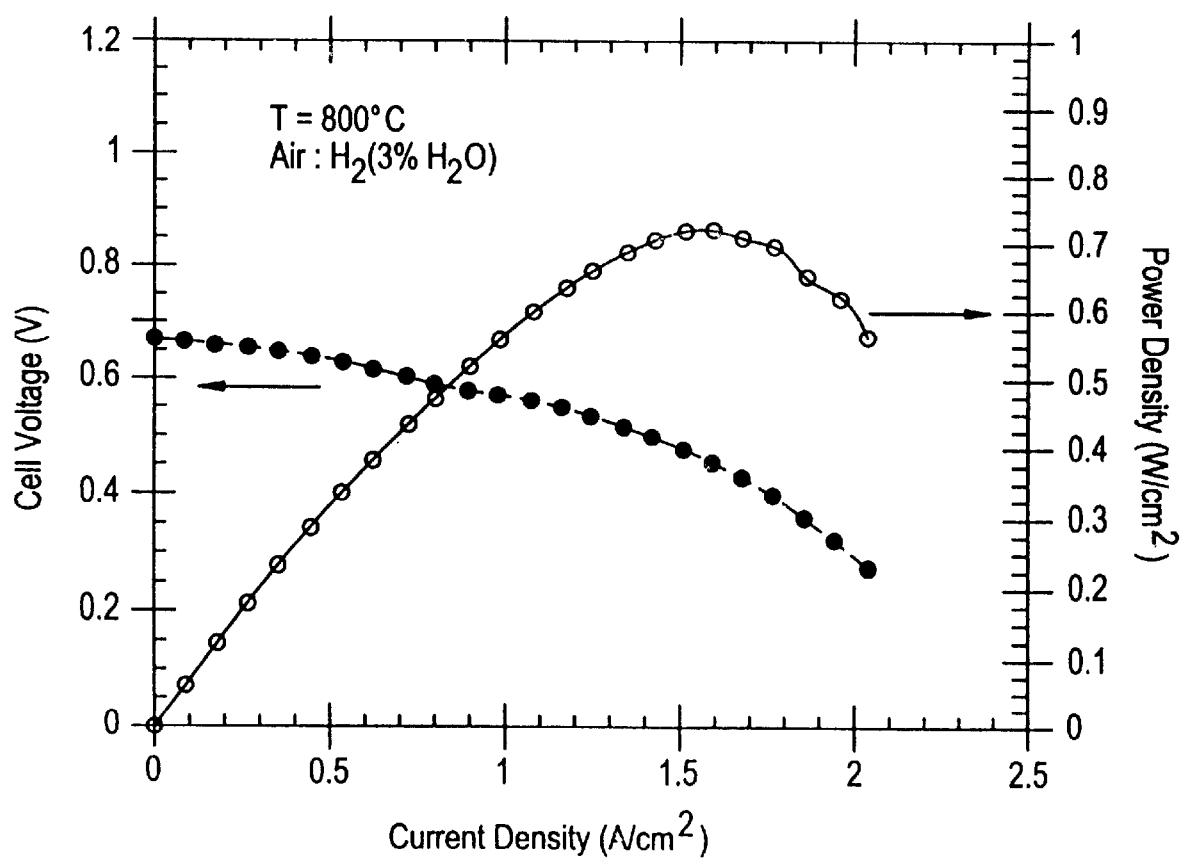
FIG. 2 is a graph plotting cell voltage and power density against current density for a $PrCoO_3$ electrocatalyst for use with YSZ cells at 800° C. co-fired at a 1:1 mole ratio.

For a sample preparation for $PrCoO_3$+YSZ, 1.972 grams of yttria stabilized zirconia (Tosoh TZ-8Y) was mixed with 3.789 grams of $Pr_{0.9}CoO_3$, prepared as described previously. The mixture corresponding to a 0.93:1 ratio of Pr:Zr was ground in a mortar and pestle and heated to 1250° C. in an alumina crucible. The resulting dark gray powder was shown by x-ray diffraction to be a mixture of $Pr_2Zr_2O_7$ and YSZ. When the powder was pressed into a pellet and sintered at 1450° C., it gave an x-ray diffraction pattern that corresponded to $Pr_2Zr_2O_7$ with no second phase present. The density of a pellet sintered at 1450° C. was 4.844 gms/cc. FIG. 2 illustrates the test results.

$Pr_6O_{11}$+YSZ

For a sample preparation for $Pr_6O_{11}$+YSZ, 6.773 grams of yttria stabilized zirconia (Tosoh TZ-8Y) was mixed with 8.493 grams of $Pr_6O_{11}$ (Alfa 99.9%). This mixture, corresponding to a mole ratio Pr:Zr=0.99:1 was ball milled for 15 hours using ⅜" zirconia media to grind the powders together. The resulting slurry was dried at 80 degrees under vacuum and heated to 1450° C. for 3.5 hours in an alumina crucible. The resulting brown powder matched the x-ray diffraction pattern of $Pr_2Zr_2O_7$ but with a sizeable shift in lattice parameters, indicating that Y is probably in solid solution. The density of a pellet prepared from this mixture and sintered at 1450° C. was 4.144 grams/cc.

$Pr_6O_{11}$+$ZrO_2$

For a sample preparation for $Pr_6O_{11}$+$ZrO_2$, 6.443 grams of zirconium oxide (Fisher Scientific) was mixed with 8.883 grams of $Pr_6O_{11}$ (Alfa 99.9%). This mixture, also corresponding to a mole ratio Pr:Zr=0.99:1 was ball milled for 7.5 hours using ⅜" zirconia media to grind the powders together. The resulting slurry was dried at 80 degrees under vacuum and heated to 1450° C. for 5 hours in an alumina crucible. The resulting cream powder matched the x-ray diffraction pattern of $Pr_2Zr_2O_7$ (JCPDS 20–1362) with no shift in lattice parameters. The density of a pellet prepared from this mixture and sintered at 1450° C. was 4.633 grams/cc.

To make sample pellets, 1.26–1.28 grams of each powder mixture was screened through 60 mesh and pressed into a pellet using a ½" die at 2500 pounds in a Carver laboratory press. The pellets were heated and cooled using the following schedule:

| Heated | |
|---|---|
| Room Temperature to 1000° C. | at 8° C. per minute |
| 1000° C. to 1450° C. | at 2° C. per minute |
| Held at 1450° C. for 6 hours | |
| Cooled | |
| sintering temperature to 1000° C. | at 2° C. per minute |
| 1000° C. to room temperature | at 8° C. per minute |

The resulting disc shaped pellets were sputter coated on the top and bottom surfaces with a 1000 Å coating of platinum. A thin layer of platinum ink (Engelhard SC6008) was brushed onto each surface of the pellet and dried for 30 minutes at 80° C. The pellet was fired at 900° C. for 1 hour to bake on the ink. Two pieces of 0.010" platinum wire were coiled and attached to each side of the pellet using a thin layer of the Engelhard ink, which was baked in a similar fashion.

B. Impedance Measurement

Again, the equipment and methods used for measuring impedance spectroscopy are conventional and will thus not be described in detail. The coiled platinum wires from the previous step were spot welded to the platinum leads, encased in ceramic feed-through, running from the Solatron SI1260 Frequency response analyzer. The samples and the attached platinum were heated in a 3" tube furnace. Thermocouples used to monitor the temperature inside the furnace were located close to each sample. Samples were equilibrated for 2–3 hours at each temperature, except for the 796° C. and 609° C. data which was equilibrated overnight. An estimate of the error due to finite equilibration time was obtained by comparing the 2 hour equilibration data with the overnight equilibration data at 796° C. The extra equilibration time made a difference in calculated resistivity of <1.5%. After temperature equilibration, the impedance spectra was measured in the frequency range between 1 Hz and 10 MHz. The data was adjusted by subtracting a null measurement that consisted of two platinum leads identical to the leads that were attached to the sample but spot welded together at their ends.

Figure 3:
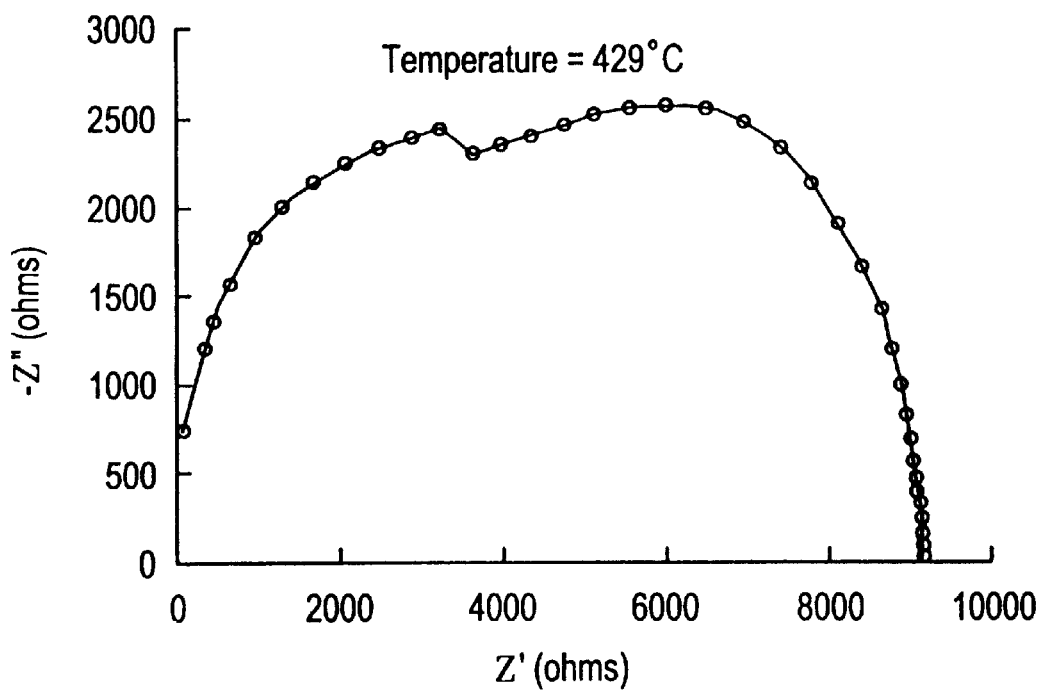
FIG. 3 is a graph plotting the impedance spectrum of $Pr_2Zr_2O_7$ at 429° C. and a frequency range of 10 Mz (left) to 1 Hz (right intercept)
Figure 4:
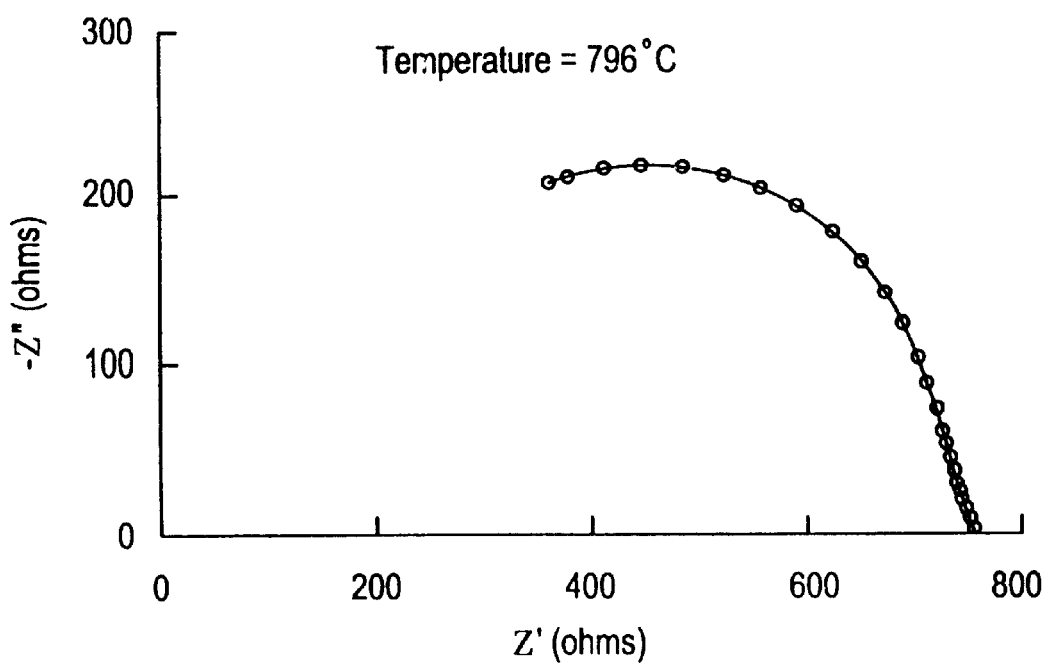
FIG. 4 is a graph similar to FIG. 3 but at 796° C.

Frequency response spectra for $Pr_2Zr_2O_7$ at two different temperatures are shown in FIGS. 3 and 4. According to a standard text on impedance spectroscopy, each "semicircle" describes the resistance (R) and capacitance (C) of an element of the microstructure. These microstructural elements can be the grain resistance of the sample, the grain boundary resistance of the sample, or the interface between the sample and the platinum electrodes. The width of the semicircles describes the resistance of each element, and the frequency at which the semicircle is formed is related to the RC time constant. The RC time constants of the different elements can often overlap, which explains why only two elements are seen at 429° C. and one element at 796° C.

A thorough analysis of this data would require doing experiments of samples of different thicknesses and grain sizes to identify each of the semicircles in FIGS. 3 and 4. For purposes of this analysis, we chose to analyze the total resistance of the sample (including the contact resistance to the electrode) as a function of temperature. The nulling procedure described previously eliminated the resistance due to the platinum wires running from the analyzer to the sample.

Figure 5:
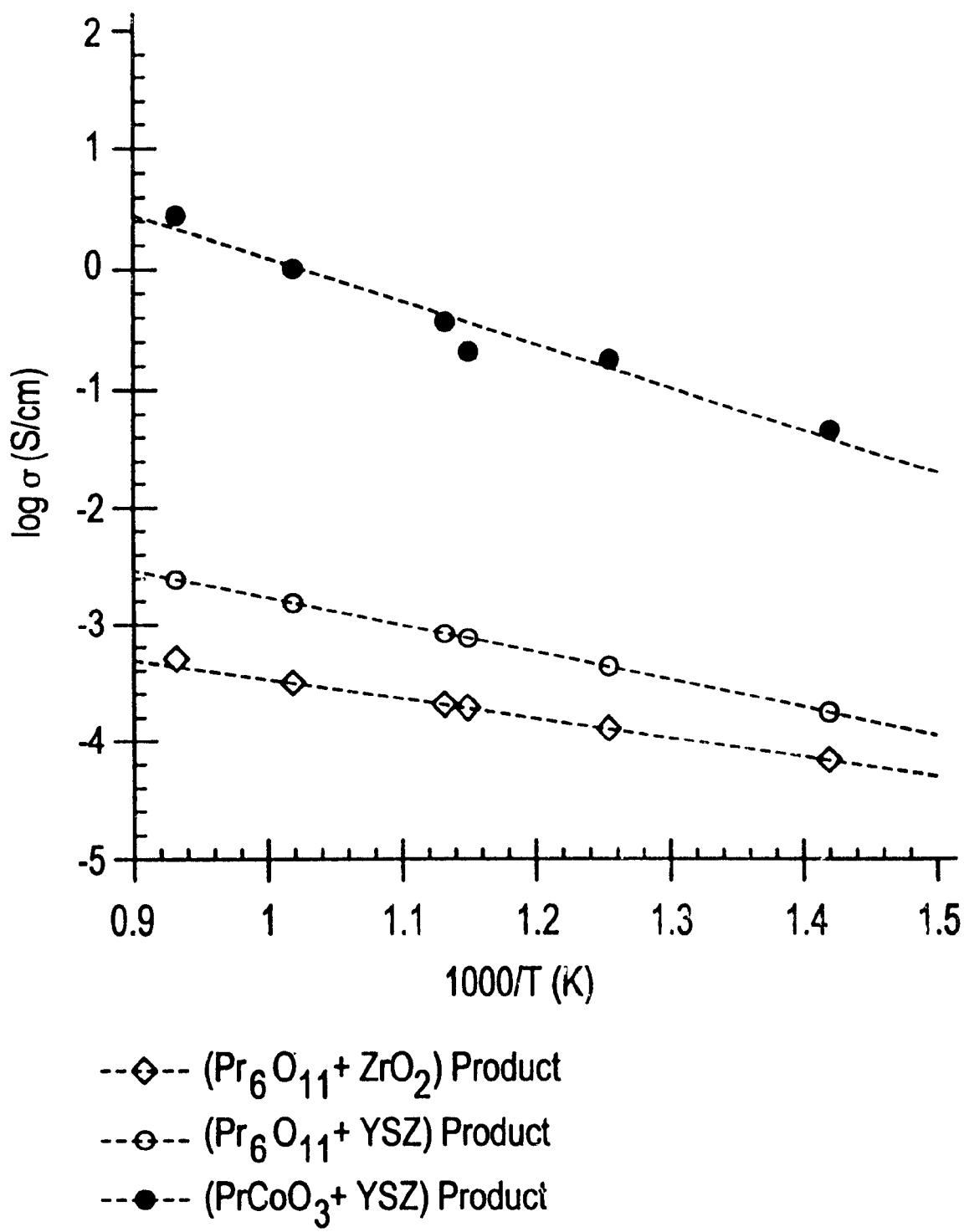
FIG. 5 is a so-called Arrhenius plot of total resistance of the $Pr_2Zr_2O_7$ samples prepared by the reaction of Pr oxide with $ZrO_2$ and YSZ and by the reaction of $PrCoO_3$ with YSZ respectively, the open diamonds representing the results for $Pr_2Zr_2O_7$ which has not been doped, and the open circles representing the results for the Y-doped $Pr_2Zr_2O_7$, and the filled circles representing the results for the product of the reaction of $PrCoO_3$ with YSZ.

FIG. 5 shows the Arrhenius plot of the total conductivity of the $Pr_2Zr_2O_7$ samples prepared from $Pr_6O_{11}$+$ZrO_2$, $Pr_6O_{11}$+YSZ, and $PrCoO_3$+YSZ, after correction for resistance of the platinum lead wires. The increased conductivity of the Y-doped $Pr_2Zr_2O_7$ sample compared to the undoped $Pr_2Zr_2O_7$ sample is believed to be either a bulk or a grain boundary effect. The activation energy calculated between 400° C. and 800° C. was 0.41 eV for the undoped sample and 0.46 eV for the yttrium-doped sample. These activation energies are approximately half the activation energy for bulk YSZ.

As seen in FIG. 5, the conductivity of the $PrCoO_3$+YSZ reaction product is significantly higher than either $Pr_2Zr_2O_7$ or yttrium-doped $Pr_2Zr_2O_7$. At the higher temperatures (>600° C.), the total resistance of the $PrCoO_3$+YSZ sample plus the platinum lead wires was believed to be dominated by the resistance of the lead wires. Therefore, a "pseudo-four probe" configuration (i.e., separate current and voltage leads attached to the sample at the same point) was used to measure the conductivity of $PrCoO_3$+YSZ samples at 800° C. obtaining a value of ~3 S/cm, which is consistent with the two probe data obtained and shown in FIG. 5. We measured several samples this way and observed that the measured conductivity was very sensitive to the method of the electrode preparation. Thus, it is believed that the measurements shown in FIG. 3 for temperatures greater that 800° C. were influenced by the contact resistance at the electrode/sample interfaces and that 3 S/cm represents a lower bound to the conductivity at 800° C. of this reaction product.

Step c—Cell Performance Data

In order to determine if the product of the reaction between $PrCoO_3$ and YSZ was electrocatalytically active, a cell was made and tested as follows. A 1.25" dia. disk was pressed from 2.5 g of a mixture of NiO(62 wt %)/YSZ(38 wt %). The mixture of NiO/YSZ was prepared by ball milling 31.0 g of NiO (Alfa), 19.0 g of YSZ (Tosoh TZ-8Y), and 1.45 g of latex binder (30998.5) in 65 mL of ethanol and 10 mL of water for 1.5 days. A thin coating of YSZ was applied to one face of the NiO/YSZ disk by placing 7 to 8 drops of a dispersion of YSZ in absolute ethanol on the face of the disk and quickly tilting the disk in a circular fashion to completely and as uniformly as possible cover the face of the disk. The dispersion was prepared by sonicating a suspension of 0.5 g of YSZ in 20 mL of absolute ethanol for about 2 minutes with a titanium horn. The coated disk was allowed to dry for 50 minutes under a glass cover dish. The coating procedure was repeated three more times for a total of four applications (this typically yields a sintered YSZ electrolyte membrane about 15 $\mu$m thick).

Next, a coating of a mixture of YSZ, $PrCoO_3$, and graphite was applied to the face of the disk which was previously coated with YSZ. The YSZ/$PrCoO_3$/graphite mixture was prepared by sonicating a suspension of 1.043 g YSZ (Tosoh TZ-8Y), 2.146 g $PrCoO_3$ and 1.511 g of graphite (Alfa, −325 mesh size) in 7 mL of absolute ethanol. After drying for about 2 hours, the disk was fired according to the following schedule: heat from room temperature to 300° C. in 1:10, 300° C. to 750° C. in 5:00, 750° C. to 800° C. in 1:30, 800° C. to 1200° C. in 2:30, 1200° C. to 1225° C. in 3:00, cool 1225° C. to 1000° C. in 2:00, 1000° C. to 500° C. in 2:30, then furnace cool from 500° C. to room temperature (RT). After firing, the trilayer disk was about 1.0" dia. and was slightly warped. The trilayer disk was creep flattened by firing under the weight of a setter for 3 hours at 1250° C.

Platinum (Pt) ink was painted onto the faces of the fuel cell and fired at 900° C. for 1 hour. After cooling, a second coating of Pt ink was applied with silver mesh attached to both the anode and cathode faces of the fuel cell. The cell assembly was then fired for 1.5 hours at 900° C. The Pt ink and the silver mesh serve as current collectors for the cell testing apparatus and are needed to complete the assembly of the cell.

Cell performance data was obtained at 800° C. using humidified hydrogen (about 3% water) as the fuel gas and air as the oxidant gas. The air flow across the cathode was maintained at about 525 mL/minute and the fuel flow across the anode maintained at about 115 ml/minute. The cell open circuit voltage was 0.67 V. The cell produced a peak power density of 0.72 W/cm$^2$.

While a specific embodiment of the invention has been shown and described in detail to illustrate the application of the principles of the invention, it will be understood that the invention may be embodied otherwise without departing from such principles.

We claim:

1. A cathode composition for a solid oxide fuel cell having an anode and a cathode comprising:

30–70 percent by weight of an yttria stabilized zirconia; and dispersed in a substantially uniform manner within the yttria stabilized zirconia, 70–30 percent by weight of a material consisting essentially of: (i) a transition metal perovskite of praseodymium, terbium, or neodymium, and (ii) reaction products formed by the sintering of the yttria stabilized zirconia and the transition metal perovskite of praseodymium, terbium, or neodymium.

2. The cathode composition according to claim 1, wherein the transition metal perovskite is selected from the group consisting of: praseodymium cobaltite and praseodymium manganite.

3. The cathode composition according to claim 1, wherein the reaction products include at least one zirconate of Pr, Tb, or Nd.

4. The cathode composition according to claim 1, wherein the reaction products include $Pr_2Zr_2O_7$.

* * * * *